US009152793B2

(12) United States Patent
Futral

(10) Patent No.: US 9,152,793 B2
(45) Date of Patent: Oct. 6, 2015

(54) METHODS, SYSTEMS AND APPARATUS TO SELF AUTHORIZE PLATFORM CODE

(71) Applicant: William T. Futral, Portland, OR (US)

(72) Inventor: William T. Futral, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 13/630,690

(22) Filed: Sep. 28, 2012

(65) Prior Publication Data

US 2014/0095886 A1 Apr. 3, 2014

(51) Int. Cl.
*G06F 11/30* (2006.01)
*G06F 12/14* (2006.01)
*G06F 21/57* (2013.01)
*G06F 21/72* (2013.01)

(52) U.S. Cl.
CPC .............. *G06F 21/572* (2013.01); *G06F 21/57* (2013.01); *G06F 21/72* (2013.01)

(58) Field of Classification Search
CPC ....... G06F 21/57; G06F 21/575; G06F 21/51; G06F 21/445; G06F 2211/009; G06F 21/72; G06F 21/572; H04L 63/0823; H04L 9/321; H04L 9/3247; G04L 63/12
USPC .................. 713/187, 189, 194, 156, 170, 176; 726/2, 4–6, 16–18, 22, 25, 27; 380/282–285
See application file for complete search history.

(56) References Cited

U.S. PATENT DOCUMENTS 7,216,369 B2* 5/2007 Wiseman et al. ............... 726/34
7,461,249 B1* 12/2008 Pearson et al. ................ 713/156
8,024,579 B2* 9/2011 Challener et al. .............. 713/187
8,032,942 B2* 10/2011 Smith et al. ..................... 726/27
8,332,653 B2* 12/2012 Buer .............................. 713/189
8,566,606 B2* 10/2013 Movva et al. .................. 713/187
2009/0172639 A1* 7/2009 Natu et al. ..................... 717/120

OTHER PUBLICATIONS

Wojtczuk et al., "Attacking Intel® Trusted Execution Technology," Invisible Things Lab, Black Hat DC, Feb. 18-19, 2009, Washington DC, 122 pages.
Intel®, "Intel® Trusted Execution Technology (Intel® TXT)," Software Development Guide, Mar. 2011, 112 pages.
Intel®, "Intel® Trusted Execution Technology," © 2010, 8 pages.
Parno, Bryan, The Platform Module (TPM) and Sealed Storage, Jun. 21, 2007, 3 pages.
Wikipedia, "Trusted Platform Module," retrieved from Wikipedia on Jun. 13, 2012, 5 pages.
Rutkowska, Joanna, "Thoughts About Trusted Computing," Invisible Things Lab, confidence Krakow, Poland May 15-16, 2009, EuSec West London UK, May 27-28, 2009, 150 pages.

* cited by examiner

*Primary Examiner* — Saleh Najjar
*Assistant Examiner* — Feliciano Mejia
(74) *Attorney, Agent, or Firm* — Hanley, Flight & Zimmerman, LLC

(57) ABSTRACT

Methods and apparatus are disclosed to self authorize platform code. A disclosed example method includes storing a hash of a first public key in a policy data structure of a platform at a first time, extracting a second public key from a signature block associated with a data structure to be authenticated at a second time, when a hash of the second public key matches the hash of the first public key, extracting an encrypted hash from that signature block, decrypting the encrypted hash using the second public key to determine a decrypted value, and comparing the decrypted value with a hash of the data structure to verify the data structure integrity.

16 Claims, 10 Drawing Sheets

METHODS, SYSTEMS AND APPARATUS TO SELF AUTHORIZE PLATFORM CODE

FIELD OF THE DISCLOSURE

This disclosure relates generally to platform security, and, more particularly, to methods, systems and apparatus to self authorize platform code.

BACKGROUND

Platform managers may be responsible for updating, troubleshooting and/or maintaining any number of computing platforms. Server farms may house thousands of computing platforms, such as computer servers, designed and/or otherwise configured to facilitate cluster computing and web hosting. In the event updates are required for the computer servers, the platform managers may participate in code update operations for each of the many computing platforms operating at one or more server farms. Current security technologies measure platform components and operating system code and compare those measurements to known-good values each time a server platform boots. An update to either the platform firmware and/or operating system requires that the platform manager update the list of known-good measurements on each updated platform.

DETAILED DESCRIPTION

Figure 1:
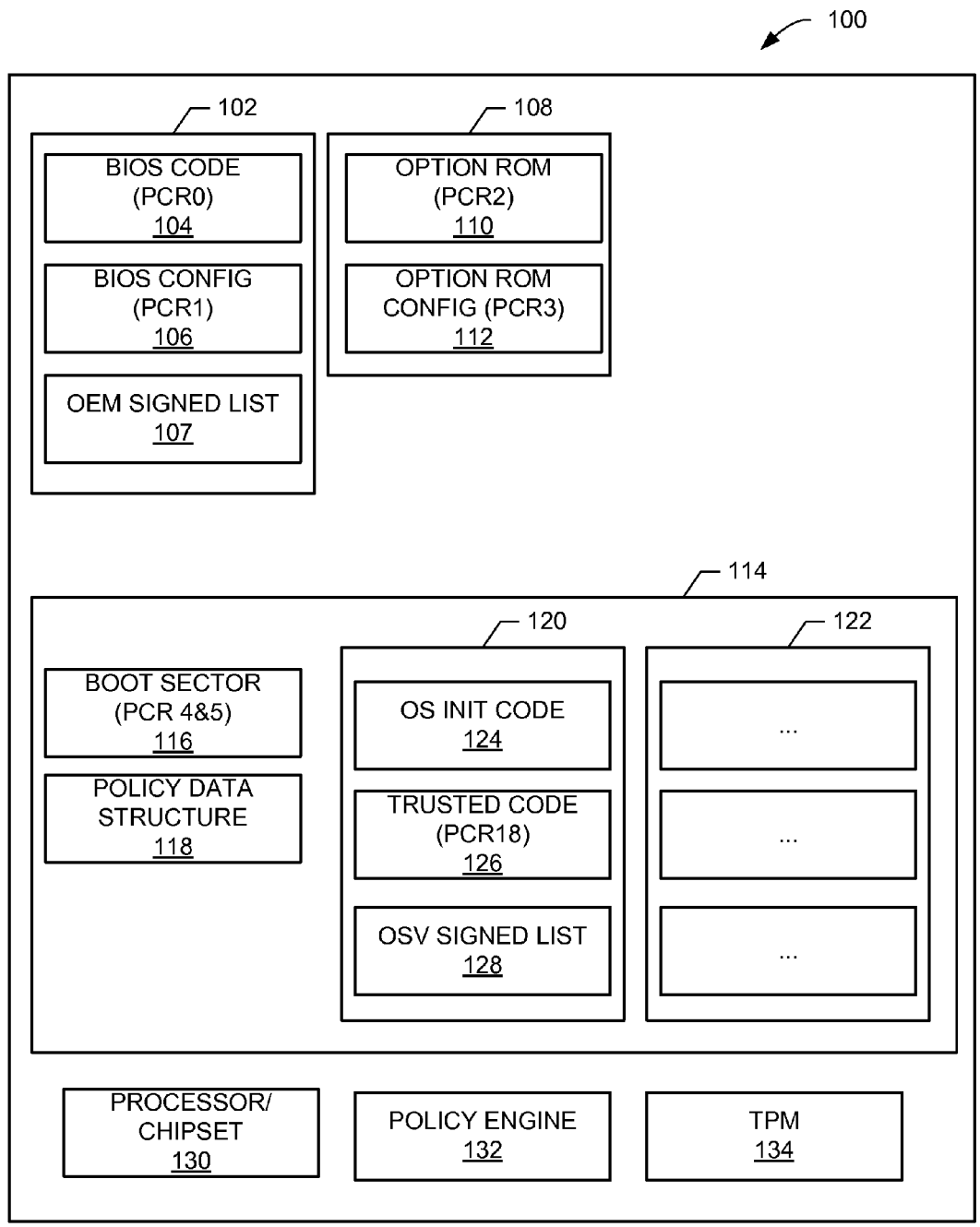
FIG. 1 is a schematic illustration of a platform constructed in accordance with the teachings of this disclosure to self authorize code.

A computing platform typically includes one or more processors, a basic input/output system (BIOS) and an operating system (OS). Changes to either or both of the BIOS or the OS may be required to improve platform performance, incorporate new features and/or protect the platform from one or more security risks.

Any number of computing platforms may be implemented in a server farm to provide computing resources, such as web services, e-commerce processing, scientific research and/or scalable cloud computing services (e.g., Amazon® Elastic Compute Cloud, Skytap®, etc.). Such server farms may maintain any number of platforms, in which many of the platforms may have the same and/or similar configuration. In some examples, all of the platforms include the same hardware, BIOS, OS and/or input/output peripherals. Despite circumstances in which a plurality of platforms have a duplicated and/or otherwise cloned configuration, changes to the BIOS and/or OS result in an added workload to one or more personnel (e.g., platform managers, platform owners, data center technicians, etc.) chartered with platform maintenance duties.

For example, in the event of one or more security risks associated with the OS, each platform may require an OS update to patch and/or otherwise abate the security risk(s). Computing platforms may implement one or more security systems and/or procedures to protect the platform from risk. In computing platforms that employ a Trusted Platform Module (TPM), local and remote attestation procedures may be employed to verify that improper changes have not been applied including unauthorized changes to the platform configuration and tampering with BIOS and OS code. TPM is employed on the platform at a hardware level, such as by way of a chip located on the platform motherboard, in which the TPM contains protected storage (e.g., non-volatile (NV) random access memory (RAM)), random number generator(s), decryption modules and/or encryption modules. The TPM also includes platform configuration registers (PCRs) to allow secure storage related to measurements of firmware, software, and platform specific configuration settings. TPMs typically have at least eight (8) PCRs numbered zero (0) through seven (7) dedicated to platform configuration measurements, in which PCR0 is unique to the BIOS and contains a BIOS code measurement. Measurements are typically a cryptographic hash of memory contents, which can be code, data, configuration information, or any other component stored in memory. Common hash algorithms include Secure Hash Algorithms (SHA) such as SHA-1 and SHA-256 where the resulting hash digest is a very large value (e.g., 160 bits for SHA-1) that assures uniqueness such that the likelihood of two components having the same hash value is, for all practical purposes, non-existent.

In operation, if a measurement of BIOS code, as stored in PCR0, matches a known-good value, then the system will consider the BIOS safe. Likewise, PCR1 through PCR7 contain other measurements that indicate the state of the platform and if those PCR values match known-good values, the platform configuration is considered safe. In some platforms there exists a policy engine that requires that (a) the BIOS be considered safe, (b) the platform configuration be considered safe, and (c) the OS code be considered safe before the OS is permitted to operate. This determination is made by comparing the values in PCR0 through PCR7 with known-good values and also measuring the OS code and comparing that measurement to known-good values.

If, for example, a BIOS update is required for one or more of the many platforms of the server farm, a platform manager (e.g., a human hired to monitor the equipment) must update the BIOS of each individual platform using a BIOS update from the platform manufacturer, also referred to as the original equipment manufacturer (OEM). The BIOS update is new code that, when measured, will result in a different hash value when compared with the hash value associated with the previous BIOS code (i.e., produces a different PCR0 value). Before the new BIOS code can be used to boot the OS, the platform manager must capture a corresponding hash value of the BIOS code image stored into PCR0 to place into the list of known-good values. A platform policy may require PCR0 through PCR7 (or any other number of PCRx values) to reflect a known good configuration of the platform. The platform owner creates a policy that specifies which PCRs to use to determine a platform's configuration. Upon reboot of the platform, if the BIOS code measurement stored in PCR0 matches a hash value in the list of known-good measurements, then the boot process is authorized to continue under the assumption that it is safe.

In other examples, an OS update is required for one or more of the many platforms of the server farm. In some examples, the platform manager updates the OS using an OS update from the OS vendor (OSV), which may arrive as code via e-mail, web access, Internet/intranet connection etc. In some examples, the OS update is new code that, when measured, will result in a different hash value when compared to the original hash value associated with the previous OS code. The hash value is a numeric value computed by performing a mathematical operation (e.g., a hash operation) on the bits or a portion of the bits. Likewise, the new OS measurement has to be added to the list of known-good OS measurements before that OS is allowed to execute.

Because each platform must be individually updated as explained above, the platform manager's efforts to apply BIOS updates and/or OS updates to the many computing platforms (e.g., servers) of a server farm become increasingly laborious as the number of platforms increases. The platform manager has the responsibility to find and/or otherwise define proper/secure PCR0 values, and proper/secure OS values so that only authorized code is allowed to proceed on the platforms. However, the burden of updating the launch policies and verifying authenticity of received and/or otherwise retrieved BIOS and/or OS update is a manual process that includes risk, discretionary trust on behalf of the platform manger, and may result in decisions by the platform manager to avoid implementing proper security in an effort to save time.

FIG. 1 is a schematic illustration of an example portion of a platform 100 to self authorize platform code updates. In the illustrated example of FIG. 1, the platform 100 includes a BIOS flash image 102, which includes BIOS code 104 (including BIOS specific data structures) provided by the OEM that is measured and stored in PCR0. The example BIOS flash image 102 also includes platform owner controlled BIOS configuration settings 106 including boot source selections. Measurements of the example owner configuration code 106 are typically stored in PCRs other than PCR0 (e.g., PCR 1-7). For platforms that support self authorized BIOS, the BIOS Flash Image 102 will also contain an OEM signed list 107 that contains known good PCR0 values. The example platform 100 also includes one or more add-in cards 108 having an example option read only memory (ROM) 110 and an example option ROM Configuration 112, which may be associated with PCRs other than PCR0.

In the illustrated example of FIG. 1, the platform 100 includes a system disk 114 to store one or more boot sectors 116, one or more policy data structures 118, first OS files 120 and/or second OS files 122. Each of the example OS files 120 and second OS files 122 of the illustrated example of FIG. 1 include OS initialization code 124, OS trusted code 126 (associated with PCR18) and one or more lists of trusted OS-related measurements 128. For example, some platforms may not participate in self authorization activities and, thus, store associated platform configuration and OS measurements believed to be secure in Policy Data Structure 118. While the illustrated example of FIG. 1 includes two example OS files, example methods, apparatus, systems and/or articles of manufacture are not limited thereto. The example platform 100 of FIG. 1 also includes a processor with corresponding chipset(s) 130, a policy engine 132 and a TPM 134. The example TPM 134 may be manufactured by a third party to conform to standards associated with the Trusted Computing Group (TCG), such as the TCG TPM Specification 1.2 published as ISO/IEC Standard 11889, which is incorporated herein by reference in its entirety. As described in further detail below, the example TPM 134 provides PCRs for TCG defined measurements, facilitates TPM NV RAM for secure storage of one or more policies and additional measurements, and allows for hash calculations, decryption and/or encryption functionality.

Figure 2:
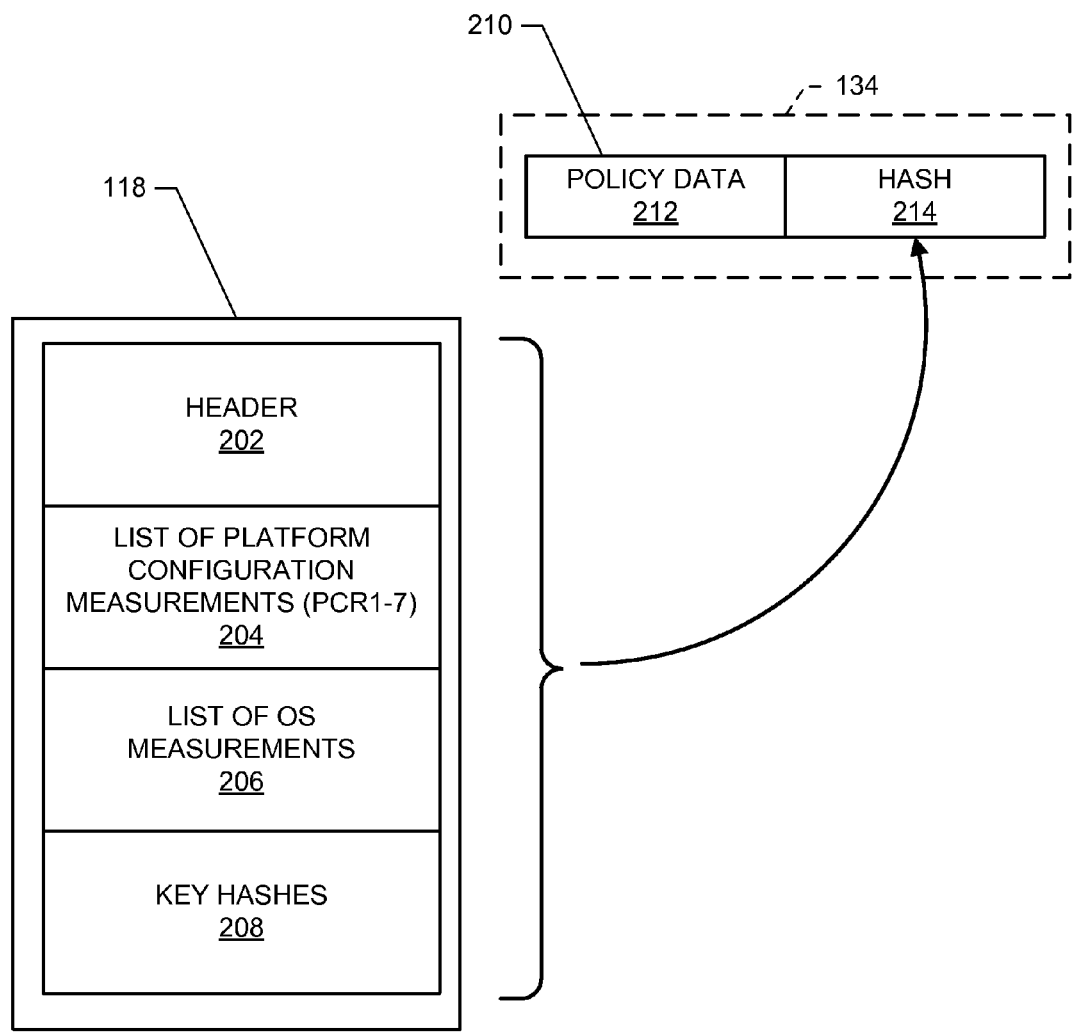
FIG. 2 is a block diagram of an example implementation of a platform policy data structure and trusted platform module non-volatile memory of FIG. 1.

FIG. 2 illustrates additional detail of the example policy data structure (PDS) 118 and the example TPM 134 of FIG. 1. In the illustrated example of FIG. 2, the PDS 118 includes a header 202, list of platform configuration measurement values 204, OS measurement values 206, and key hashes 208. For platforms that do not support self authorized BIOS, the list of platform configuration measurement values 204 would include measurements for PCR0 through PCR7. For platforms that do support self authorized BIOS, the list of platform configuration measurement values 204 would exclude measurements for PCR0, which is unique to the BIOS version.

The example OS measurement values 206 represent OS measurements for operating systems that do not support self authorized measurements. The example key hashes 208 of FIG. 2 represent one or more hashes of public keys provided by the platform OEM and/or one or more OSVs (for vendors supporting self authorized measurements). In some examples, a public key hash associated with the BIOS OEM is supplied by and/or otherwise permanently stored in the TPM 134 at the time the example platform 100 is manufactured, thereby associated with a relatively high degree of trust. The example key hashes 208 of FIG. 2 may also store a public key or key hash associated with a first OS (e.g., OSV-A) to execute on the example platform, and/or any number of additional or alternate OSs (e.g., OSV-B) to execute on the example platform (e.g., Redhat®, Linux®, Microsoft®, VMWare®, etc.).

FIG. 2 also includes additional detail of the example TPM 134 of FIG. 1. In the illustrated example of FIG. 2, the TPM 134 includes NV RAM 210 having policy data 212 and an associated PDS hash 214. As described in further detail below, to verify that the example PDS 118 has not been tampered with, a hash 214 (e.g., SHA1, SHA256, etc.) of the PDS is generated at the time the PDS is created and stored in the example NV RAM 210. In the event verification of the PDS 118 is required before allowing one or more platform 100 operations to proceed, the PDS 118 may be verified by comparing a hash of it to the previously measured hash stored in the example NV RAM 210.

Figure 3:
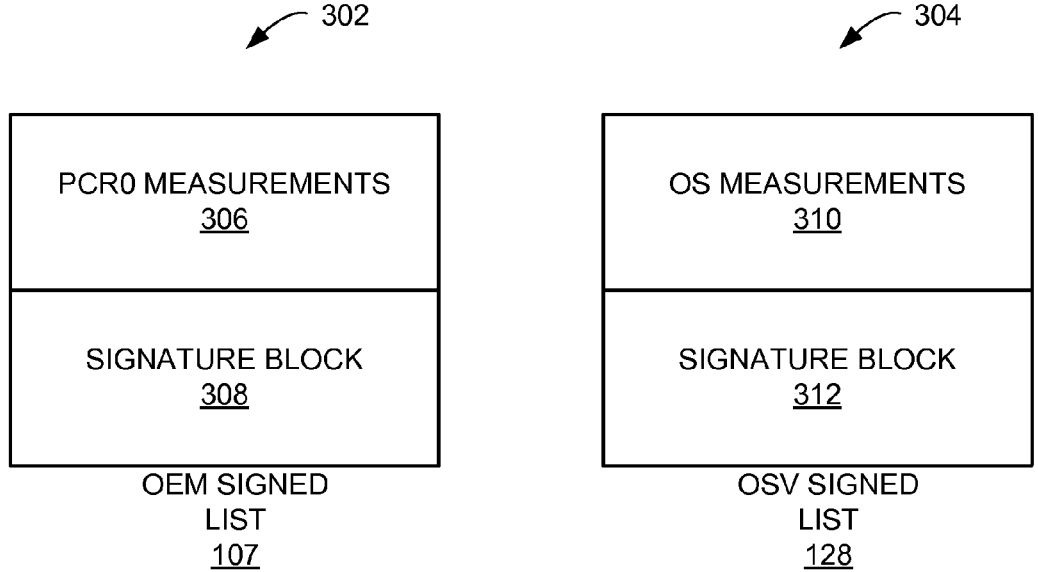
FIG. 3 illustrates example signed lists to be used with the example platform of FIG. 1.

FIG. 3 illustrates an example OEM signed list 302 (e.g., a first signed list) and an example OSV signed list 304 (e.g., a second signed list). The example OEM signed list 302 includes a list of PCR0 measurements 306 provided by the platform OEM that represent known good hash measurements of BIOS code, such as new BIOS code to accompany a BIOS update for the example platform 100. The example list of PCR0 measurements 306 is generated by the platform OEM by compiling a list of the PCR0 measurement for each platform type in the family of platforms that use that BIOS update code, which is substantially smaller than the size of the BIOS update code itself. The BIOS manufacturer also calculates the hash of the PCR0 measurements 306 and encrypts it using its private key and stores the encrypted hash digest in an example OEM signature block 308 along with the public key. As described in further detail below, providing the PCR0 measurements 306, the OEM public key and the encrypted hash of PCR0 measurements allows the platform to verify the integrity of the PCR0 measurements 306. The key hashes 208 provide the means for the platform to operate as its own certificate authority, thereby eliminating a need to employ a third party trusted certificate service (e.g., VeriSign®).

The example OSV signed list 304 includes a list of OS measurements 310 provided by the OSV that represents a hash measurement of associated OS code after the update(s). The example list of OS measurements 310 is generated by the OSV by taking a measurement of the OS updated trusted code. The OSV also signs the list by calculating the hash of the list of OS measurements 310 and encrypts that hash digest using its private key and stores the encrypted hash in an example OSV signature block 312 with a copy of its corresponding public key. Likewise, providing the OS measurements, the OSV public key and the encrypted hash of OS measurements allows the platform to verify the integrity of the OS measurements. The key hashes 208 provide for the platform to operate as its own certificate authority for the OSV keys).

Figure 4:
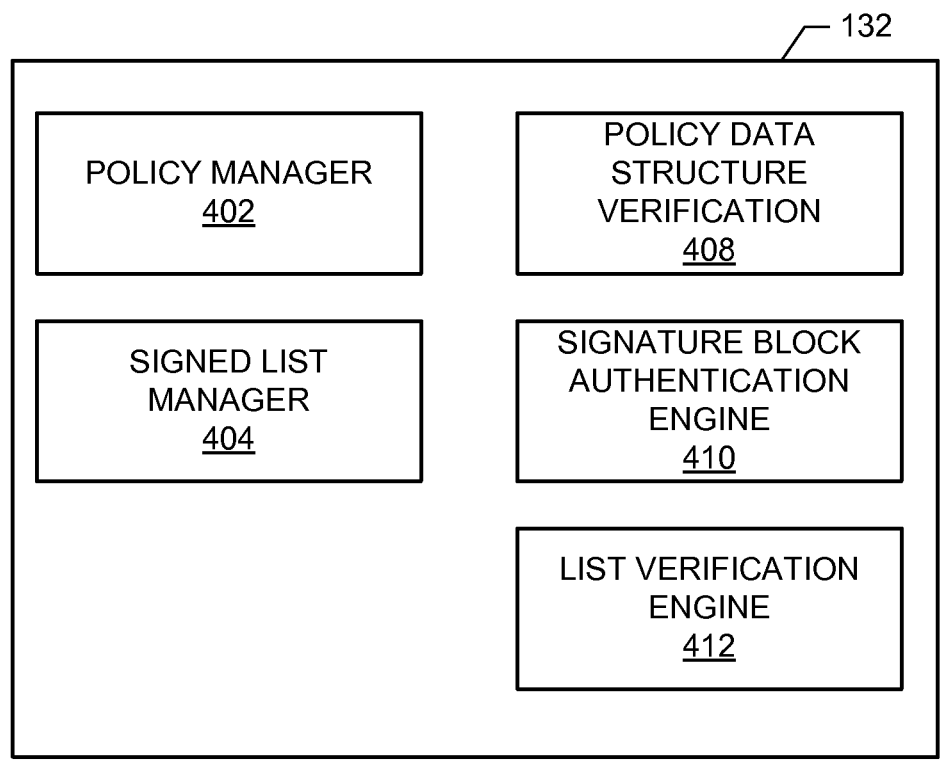
FIG. 4 is a schematic illustration of an example implementation of the policy engine of FIG. 1.

FIG. 4 is a schematic illustration of additional detail of the example policy engine 132 of FIG. 1. In the illustrated example of FIG. 4, the policy engine 132 includes a policy manager 402, a signed list manager 404, a policy data structure verification engine 408, a signature block authentication engine 410 and a list verification engine 412. In operation, the example policy manager 402 generates a platform policy for the example platform 100 at or near the time of platform deployment or any time that the platform owner wishes to change policy or install another OS. In some examples, the policy manager 402 saves a hash of the public key associated with the platform OEM to the example PDS 118, such as within the example key hashes 208. In other examples, the policy manager 402 saves a hash of the public key associated with the OSV to the example key hashes 208, and or any number of additional and/or alternate key hashes indicative of OSs that may operate on the example platform 100 (e.g., OSV-A, OSV-B, etc.).

Updates may occur when a new and/or alternate image is saved to the example BIOS flash image 102, OSV-A 120, OSV-B 122, etc. However, to verify that any new code update to the example platform 100 is safe and to avoid inundating the platform manager(s) with manual updating tasks associated therewith, example methods, apparatus, systems and/or articles of manufacture update the signed list 302, 304 in connection with the code update. On each boot, the signed list manager 404 detects the presence of a signed list 302, 304, then the example policy manager 402 determines whether the platform 100 policy is configured to allow self authorization to occur. For example, the platform manager may choose to maintain a manual update policy for one or more platforms, and/or some platforms may not be configured to process the example signed list 302, 304. In such circumstances, example methods, apparatus, systems and/or articles of manufacture allow traditional manual updating procedures to occur.

If the example policy manager 402 is configured to process the example signed list 302, 304 then upon each boot the following process occurs. Before permitting the trusted OS to execute on the example platform 100, the example PDS verification engine 408 verifies that the PDS 118 is in a known good state (e.g., not tampered with and/or can otherwise be trusted). Additionally, because any signed list received from a BIOS OEM and/or OSV cannot inherently be trusted, the example signature block authentication engine 410 verifies that the signature block is from the expected vendor (e.g., the platform manufacturer, the OSV-A, the OSV-B, etc.), and that it has not been tampered with. Still further, the example list verification engine 412 verifies that any received measurements of BIOS code and/or OS code are safe, as described in further detail below. Accordingly, example methods, apparatus, systems and/or articles of manufacture disclosed herein eliminate the need for the platform manager to (a) make any trust assumptions that a BIOS code update and/or OS update is valid and/or otherwise untampered, (b) identify proper PCR0 measurement values and/or Measured OS values in view of new and/or alternate BIOS code and/or OS code, and (c) update contents of PDS 118 with proper measurement values.

In response to a request to execute the Trusted OS Code 126, the example PDS verification engine 408 takes a hash of the example PDS 118 and compares it to the hash value stored in the example TPM NV RAM 210. As described above, the example PDS hash 214 was populated with the hash value of the example PDS 118 platform manager creates or updates the PDS 118. Accordingly, in the event one or more aspects of the example PDS 118 are tampered with, such as the example header 202, the example list of platform configuration measurement values 204, the example list of OS measurement values 206 and/or one or more key hashes 208, then a corresponding hash calculation of the PDS 118 will not have parity with the value previously stored in the PDS hash 214. In the event of a lack of parity between the previously stored hash measurement of the PDS 118 in the PDS hash 214 and the currently calculated measurement of the PDS 118, the example PDS verification engine 408 alerts the example policy manager 402 that the Trusted OS Code 126 should not be executed. On the other hand, in response to identifying parity between the previously stored hash measurement of the PDS 118 in the PDS hash 214 and the currently calculated measurement of the PDS 118, the example policy manager 402 authorizes the process to continue to verify that the example signature block is trustworthy (e.g., signature block 308, 312).

The example signature block authentication engine 410 extracts the public key from the example signature block (308, 312), takes a hash of the public key and determines whether a matching hash resides in the example key hashes 208. If not, then the example signature block authentication engine 410 identifies the signed list as lacking a degree of trust, and the example policy engine 132 disallows the code from execution and/or any other activity to the example platform 100. On the other hand, if a matching hash key value is identified in the example key hashes 208, the example signature block authentication engine 410 identifies the signature block as safe and/or otherwise trustworthy.

In response to determining that (a) the PDS 118 is safe and (b) the signature block (e.g., 308, 312) is safe and/or otherwise trustworthy, the example list verification engine 412 verifies that the measurements of the signed list (e.g., PCR0 measurements 306 of the BIOS signed list 302, OS measurements 310 of the OS signed list 304, etc.) have not been tampered with. The example list verification engine 412 extracts the list of measurements from the example signed list and computes a hash. Additionally, the encrypted measurement stored in the signature block is unencrypted using the embedded public key to derive a corresponding hash value. As described above, the third party manufacturer previously encrypted the measurement to generate the hash using its corresponding private key. As only the matched pair public key can decrypt a measurement encrypted by the matched private key, then a parity result confirms (a) the proper corresponding public key is being used and (b) the list of measurements (e.g., the list of PCR0 measurements 306, the list of OS measurements 310, etc.) is legitimate. Accordingly, the list of measurements supplied by the third party (e.g., the BIOS OEM, the OSV, etc.) can be deemed trusted. Additionally, associated code is deemed safe if its measurement is included in a legitimate list of known good measurements (e.g., PCR0 measurements 306 for BIOS code and OS measurements 310 for OS trusted code), and thus allowed to operate on the example platform 100.

While an example manner of implementing the example platform 100 and the example policy engine 132 to self authorize platform code has been illustrated in FIGS. 1-4, one or more of the elements, processes and/or devices illustrated in FIGS. 1-4 may be combined, divided, re-arranged, omitted, eliminated and/or implemented in any other way. Further, the example BIOS flash image 102, example PDS 118, example OSV-A 120, example OSV-B 122, example policy engine 132, example TPM 134, example TPM NV RAM 210, example OEM signed list 302, example OSV signed list 304, example policy manager 402, example signed list manager 404, example policy data structure verification engine 408, example signature block authentication engine 410, and/or the example list verification engine 412 of FIGS. 1-4 may be implemented by hardware, software, firmware and/or any combination of hardware, software and/or firmware. Thus, for example, any of the example BIOS flash image 102, example PDS 118, example OSV-A 120, example OSV-B 122, example policy engine 132, example TPM 134, example TPM NV RAM 210, example OEM signed list 302, example OSV signed list 304, example policy manager 402, example signed list manager 404, example policy data structure verification engine 408, example signature block authentication engine 410, and/or the example list verification engine 412 of FIGS. 1-4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example BIOS flash image 102, example PDS 118, example OSV-A 120, example OSV-B 122, example policy engine 132, example TPM 134, example TPM NV RAM 210, example OEM signed list 302, example OSV signed list 304, example policy manager 402, example signed list manager 404, example policy data structure verification engine 408, example signature block authentication engine 410, and/or the example list verification engine 412 of FIGS. 1-4 are hereby expressly defined to include a tangible computer readable storage medium such as a memory, DVD, CD, Blu-ray, etc. storing the software and/or firmware. Further still, the example platform 100 of FIG. 1 and the example policy engine 132 of FIGS. 1 and 4 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the platform 100 of FIG. 1, and the example policy engine 132 of FIGS. 1-4 are shown in FIGS. 5-9. In this example, the machine readable instructions comprise a program for execution by a processor such as the processor 1012 shown in the example computer 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 5-9, many other methods of implementing the example platform 100, and the example policy engine 132 to self authorize platform code may alternatively be used. For example, the order of execution of the blocks may be changed, and/or some of the blocks described may be changed, eliminated, or combined.

As mentioned above, the example processes of FIGS. 5-9 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or disk in which information is stored for any duration (e.g., for extended time periods, permanently, brief instances, for temporarily buffering, and/or for caching of the information). As used herein, the term tangible computer readable storage medium is expressly defined to include any type of computer readable storage device or disk and to exclude propagating signals. Additionally or alternatively, the example processes of FIGS. 5-9 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage device or disk in which information is stored for any duration (e.g., for extended time periods, permanently, brief instances, for temporarily buffering, and/or for caching of the information). As used herein, the term non-transitory computer readable storage medium is expressly defined to include any type of computer readable storage and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 5:
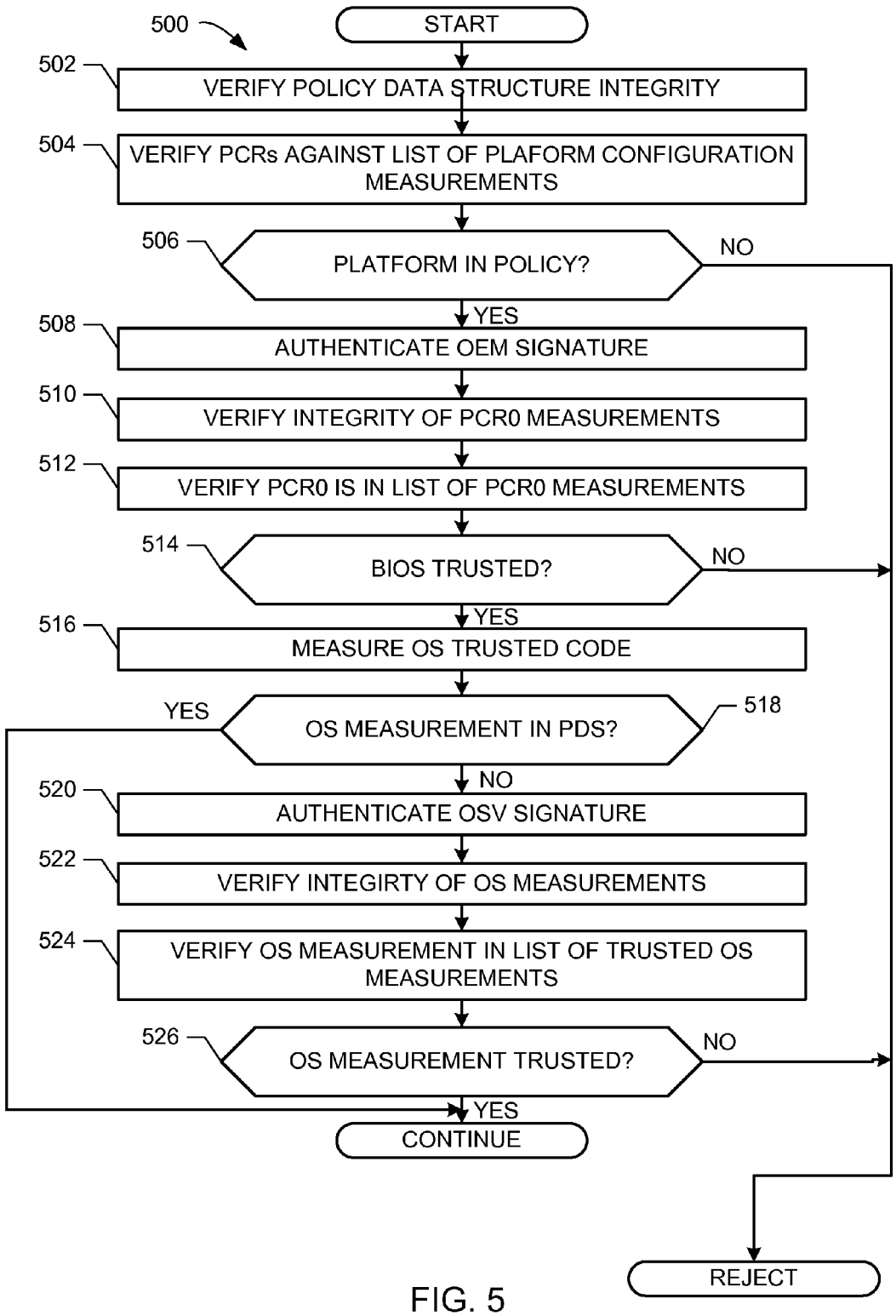
FIGS. 5-9 are flowcharts representative of example machine readable instructions which may be executed to self authorize platform code.

The program 500 of FIG. 5 begins at block 502 where the example policy manager 402 for the example platform 100 has been invoked to determine if the OS trusted code 126 should be permitted to execute and, thus, has invoked the policy data structure verification 408 (as further discussed in FIG. 6 below). The example policy manager 402 verifies that the platform configuration is trusted via comparing the PCR values in TPM 134 with lists of known-good values stored in the PDS 118 (block 504) (as further discussed in FIG. 7 below). If either the PDS integrity is not trusted or the platform configuration as measured in PCR1-7 do not match a known good configuration (block 506), then the example policy manager 402 determines that the platform is not in policy and takes the path to reject the OS launch.

Figure 8:
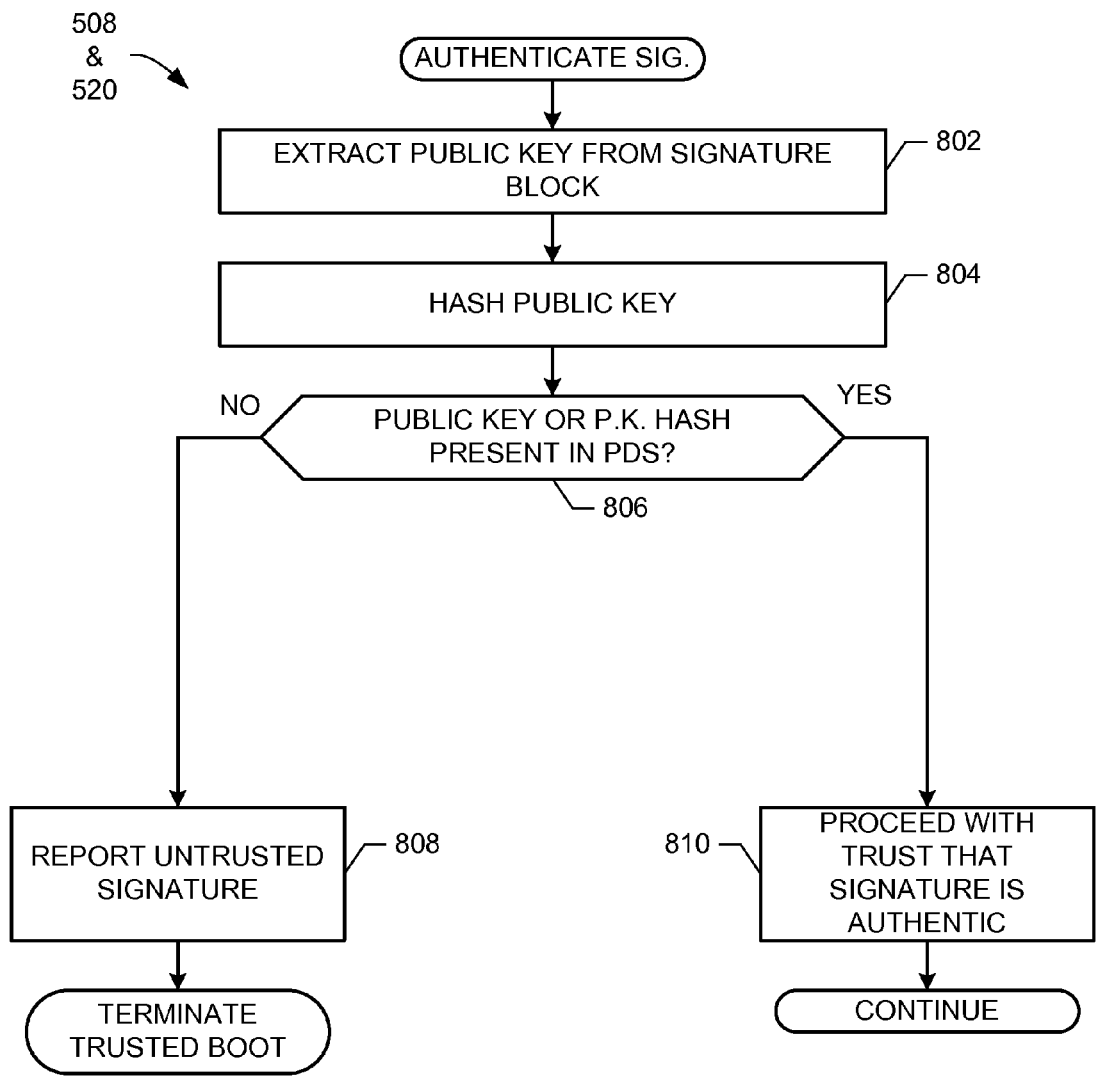

On the other hand, if the platform is in policy (block 506), the example program 500 proceeds to block 508 where the example signature block authentication engine 410 authenticates the signature of OEM signed list 107/302 (as further discussed with FIG. 8 below). The example list verification engine 412 verifies the integrity of the list (block 510) (as further discussed with FIG. 9 below). Additionally, the example list verification engine 412 verifies that the BIOS is trusted by comparing the value of PCR0 to the list of PCR0 measurements 306 (block 512). If the PCR0 value is not in the list 306, or if the list verification (block 510) failed, or if the signature authentication (block 508) failed, then the example policy engine 132 deems the BIOS as not trusted and takes the path to reject the OS launch (block 514).

On the other hand, if the BIOS is trusted (block 514), the flow proceeds to block 516 where the example policy engine 132 measures OS trusted code 126 using the hashing algorithm (e.g., SHA-1, SHA-256) as specified in the platform launch policy. The example policy engine checks if that measurement is listed in the PDS 118 list of OS measurements 206 (block 518). If it is, then the platform policy is satisfied, the OS measurement is extended into PCR18, and the OS trusted code 126 is then executed.

On the other hand, if the OS measurement is not in the PDS list of OS measurements 206 (block 518), then the example signature block authentication engine 410 authenticates the signature of the example OSV signed list 128 (block 520) (as further discussed with FIG. 8 below). The example list verification engine 412 verifies the integrity of the list (block 522) (as further discussed with FIG. 9 below). The example list verification engine 412 also verifies that the OS code is trusted by comparing its measured value to the list of OS measurement 310 (block 524). If the measured value is not in list 310, or if list verification (block 522) failed, or if signature authentication (block 520) failed, then the example policy engine 132 concludes that the OS Code is not trusted (block 526) and takes the path to reject the OS launch. Otherwise, because the OS code is trusted, and the BIOS code is trusted, and the platform configuration is trusted, the policy engine continues with the OS trusted code 126 execution.

Figure 6:
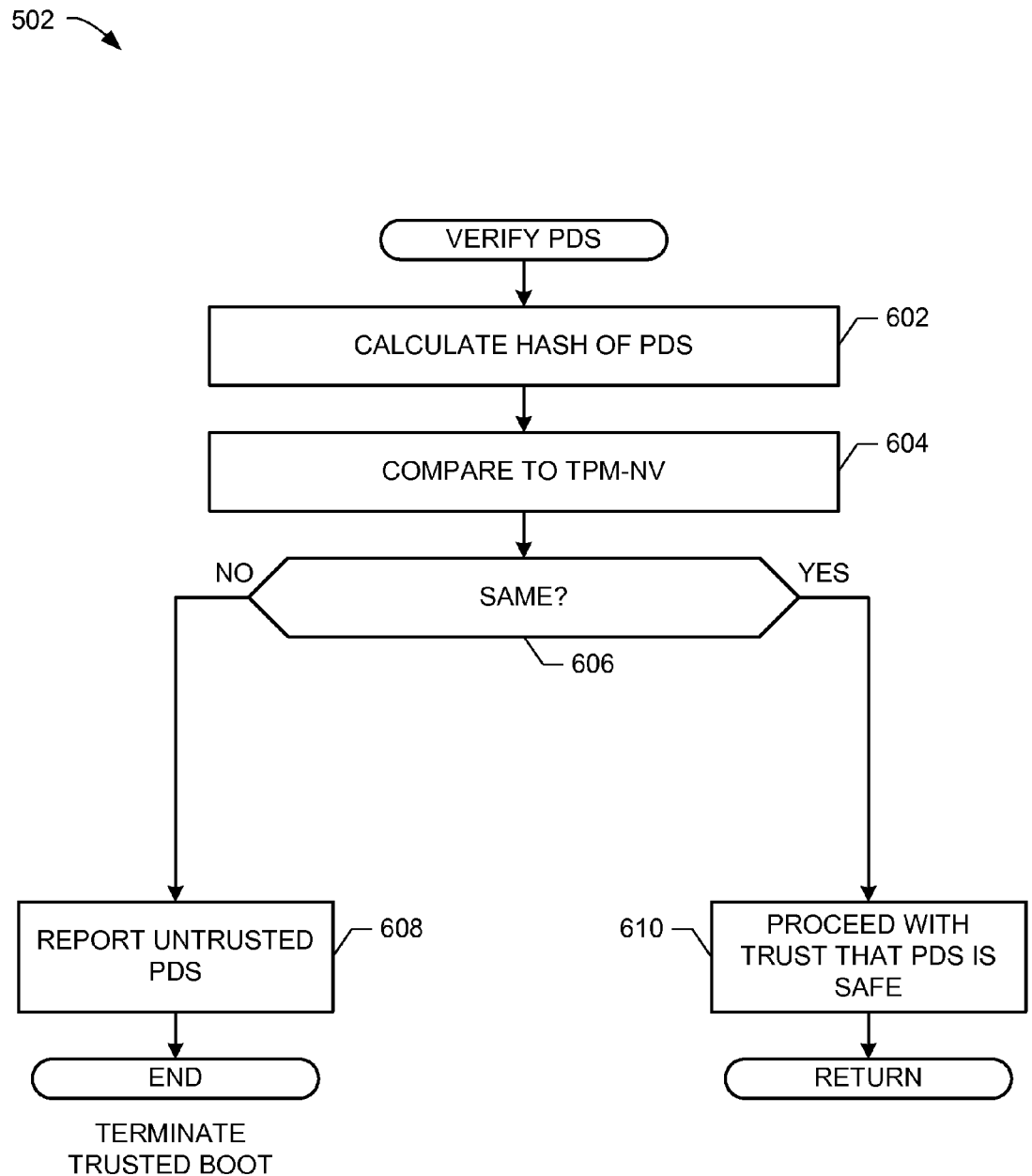

FIG. 6 illustrates the program flow for the example PDS verification engine 408. It calculates the hash of the example PDS 118 (block 602), and compares it to a hash value previously stored in the TPM NV RAM 210 (block 604). If the values are not the same (e.g., no parity) (block 606), then the example PDS verification engine 408 reports a problem with the PDS 118 and instructs the example policy engine 132 to prohibit execution of the OS code (block 608). On the other hand, in the event the stored hash in the example PDS hash 214 of the TPM NV RAM 210 is the same as the calculated hash (block 606), then the example PDS verification engine 408 prompts the example policy engine 132 to proceed with verification of the signed list (block 610).

Figure 7:
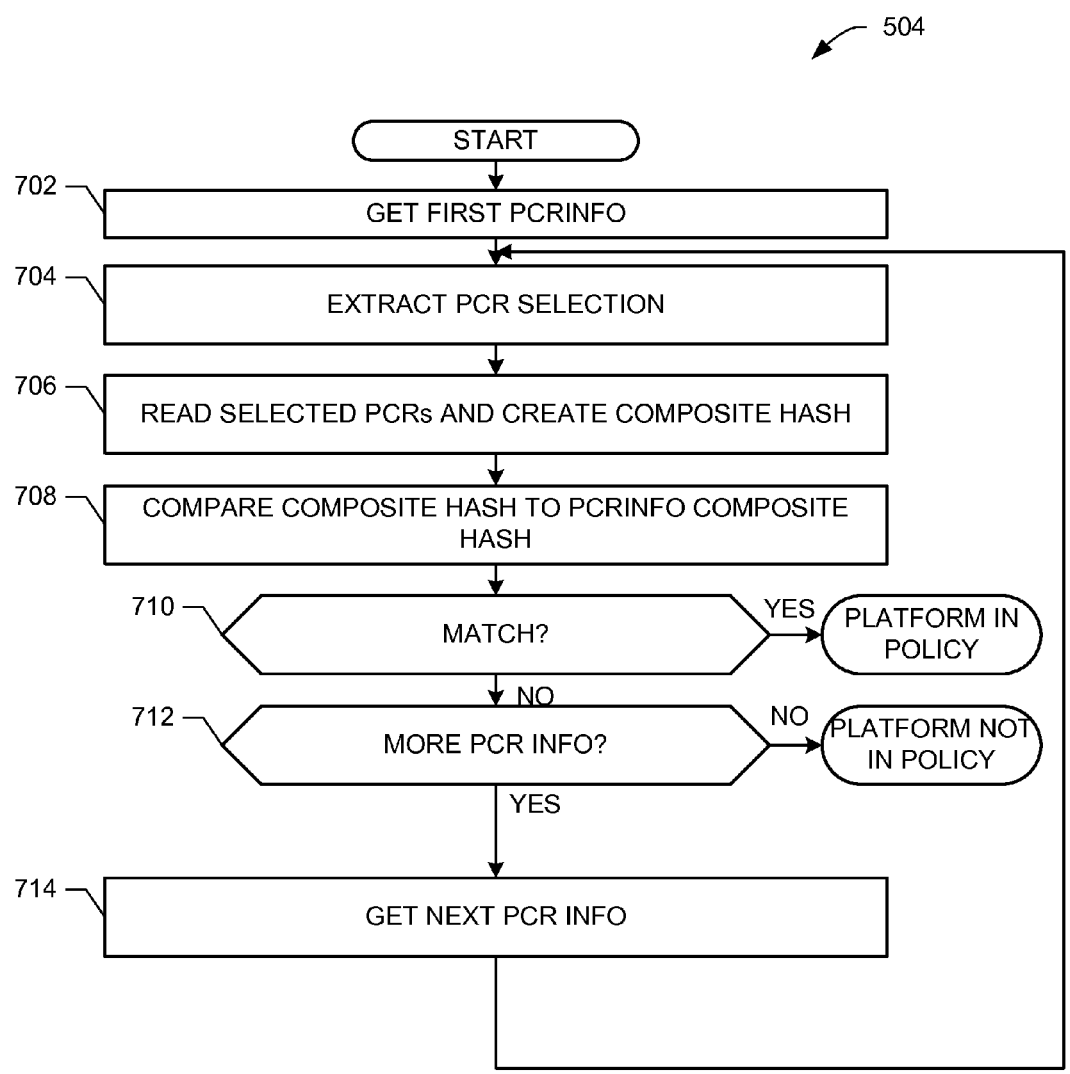

FIG. 7 illustrates verification that the platform configuration is trusted via comparing the example PCR values in the example TPM 134 with one or more lists of known-good values stored in the example PDS 118 (block 504). In the illustrated example of FIG. 7, initial PCR information is retrieved (block 702) and corresponding PCR selection(s) are extracted therefrom (block 704). A composite hash value is created from the one or more selected PCRs (block 706) and compared to a composite hash of the retrieved PCR information (block 708). In the event a match occurs (block 710), then the platform is within the platform policy. However, in the event a match does not occur (block 710), and there is no additional PCR information to evaluate (block 712), then the platform is not within the policy. In the event additional PCR information is available (block 712), then the example policy manager 402 retrieves the next available PCR information (block 714) and control returns to block 702) where the process repeats until there is a match (block 710) or there are no additional PCR information to evaluate (block 712). Returning to FIG. 5, the example signature block authentication engine 410 verifies the integrity of the OEM and/or OSV signature block (block 508, 520). In the illustrated example of FIG. 8, the example signed list manager 404 extracts the public key that is embedded in the signature block (e.g., 308, 312) of the example signed list (e.g., 302, 304) (block 802). The example signature block authentication engine 410 computes a hash of the embedded public key (block 804) and determines whether the hash value is present in the example PDS 118, such as within the example key hashes 208 (block 806). If not, then the example signature block authentication engine 410 reports that the signatures and corresponding signed lists are not to be trusted (block 808). On the other hand, if the hash value is present in the example PDS 118 (block 806), then the example signature block authentication engine 410 informs the example policy manager 402 that the signature blocks are to be trusted (block 810).

Figure 9:
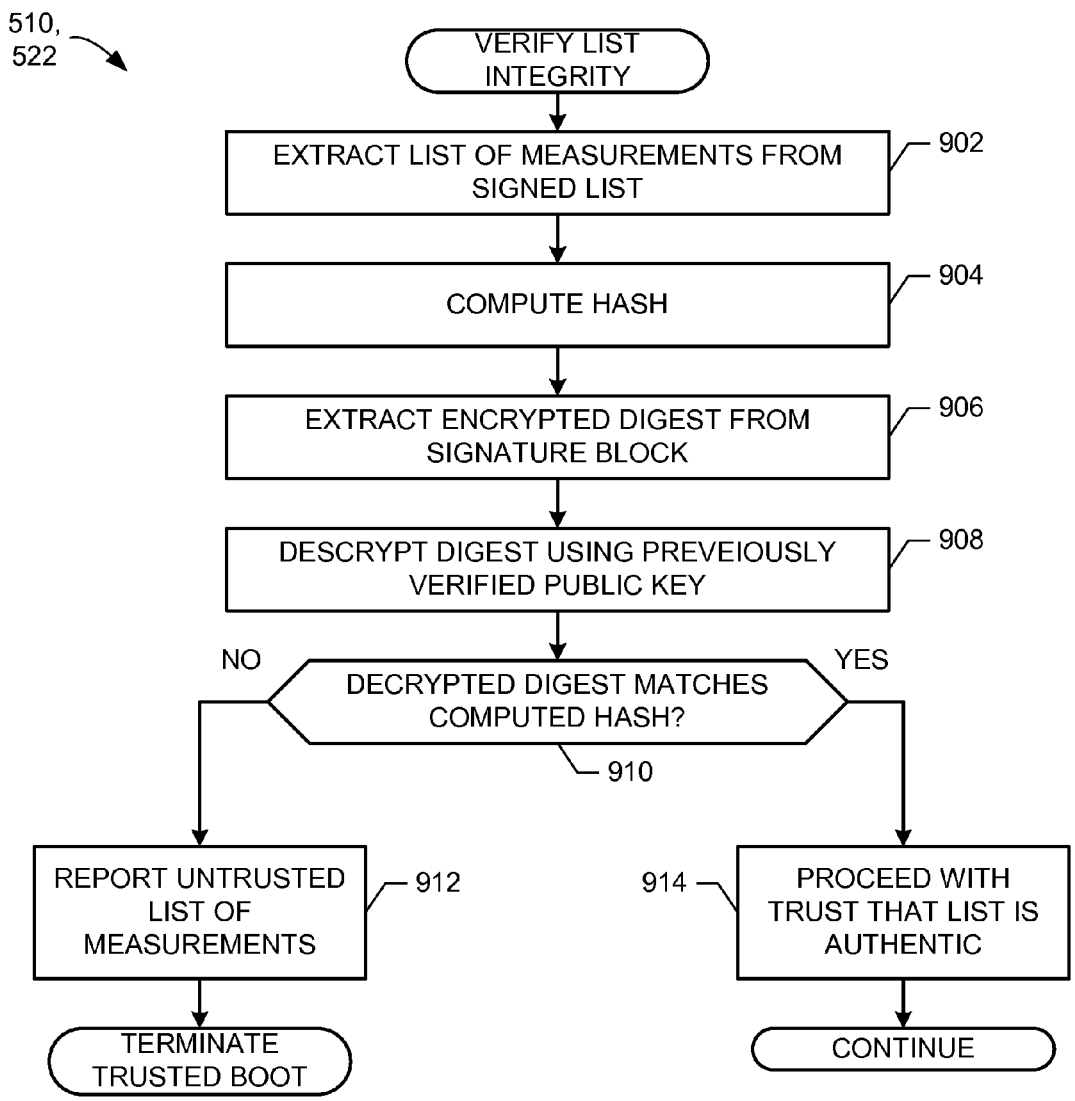

If the example PDS 118 has not been tampered with and/or is otherwise verified as safe (block 502), and that the example signature block of a corresponding signed list is safe (block 508, 520), the example list verification engine 412 verifies the integrity of one or more lists of measurements stored in the example signed list (block 902), as shown in FIG. 9. The example list verification engine 412 computes a hash of the list of measurements in the signed list (block 904), extracts the encrypted digest in the signed list (block 906), and decrypts the encrypted digest of the signed list using the previously authenticated public key provided in the example signature block (block 908). If the resulting hashes do not match (block 910), then the example list verification engine 412 reports untrusted measurements to the example policy manager 402 (block 912), thereby terminating the trusted OS launch on the example platform 100. On the other hand, if the calculated hash matches the hash value revealed by decrypting the encrypted digest stored in the signed list (block 910), then the signed list and its corresponding measurements are deemed valid (block 914).

Figure 10:
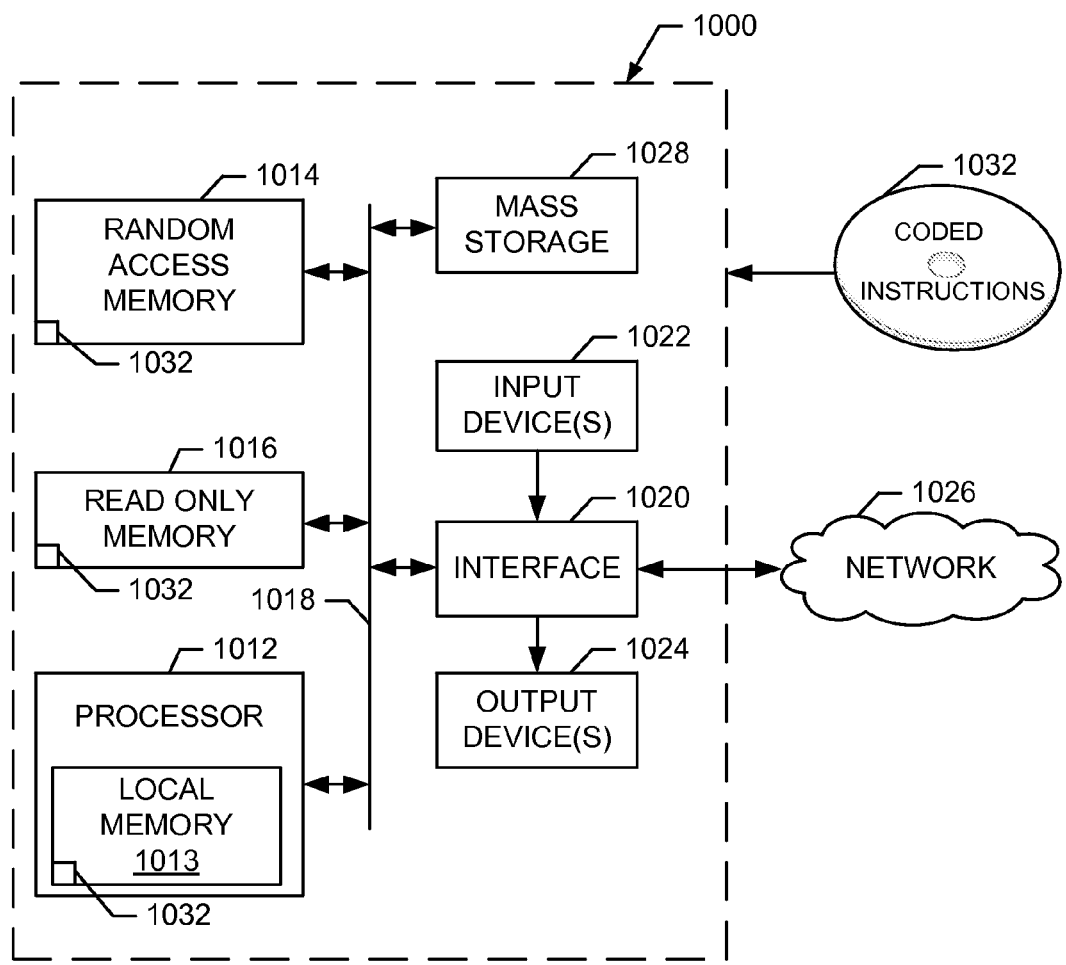
FIG. 10 is a schematic illustration of an example processor platform that may execute the instructions of FIGS. 5-9 to implement the example systems and apparatus of FIGS. 1-4.

FIG. 10 is a block diagram of an example processor platform 1000 capable of executing the instructions of FIGS. 5-9 to implement the platform 100 of FIG. 1, and the policy engine 132 of FIGS. 1-4. The processor platform 1000 can be, for example, a server, a personal computer, an Internet appliance, or any other type of computing device.

The platform 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026

(e.g., an Ethernet connection, a digital subscriber line (DSL), a telephone line, coaxial cable, a cellular telephone system, etc.).

The processor platform 1000 also includes one or more mass storage devices 1028 for storing software and data. Examples of such mass storage devices 1028 include floppy disk drives, hard drive disks, compact disk drives and digital versatile disk (DVD) drives.

The coded instructions 1032 of FIGS. 5-9 may be stored in the mass storage device 1028, in the volatile memory 1014, in the non-volatile memory 1016, and/or on a removable storage medium such as a CD or DVD.

Example methods, apparatus, systems and articles of manufacture to self authorize platform code disclosed herein substantially reduce security voids in server farms where default security policies are set to allow "any" updates to occur without proper verification. Such security voids typically occur in view of the tedious and manual process required by platform managers when a BIOS update occurs, in which PCR0 known good values must be updated, and/or when an OS update occurs, in which the known good trusted OS measurements must be updated.

Methods, systems, apparatus and articles of manufacture are disclosed to self authorize platform code. Some disclosed example methods include creating a public and private signing key, creating a list of known good measurements of the code in response to a code release, creating a hash measurement of the list and encrypting a hash value of the list using the private key, and creating a signature block including the encrypted list measurement hash and the public signing key. Other disclosed examples include storing a copy of the public key in a protected location on a platform, authenticating the key, and comparing the authenticated value with the value in the signature block. Some example methods include storing the public key in a Trusted Platform Module (TPM) to protect the integrity of the public key, and other disclosed methods include storing the public key in a file and storing a hash of the file in a Trusted Platform Module (TPM) to protect the integrity of the public key. Other disclosed examples include appending the signature block to the list of known-good measurements, and still other disclosed examples include the list of known-good measurements with the code.

Other disclosed methods include creating a cryptographic hash of a public key, storing the hash of the public key in a protected location on the platform where the key will be authenticated, and comparing the stored key hash value with a hash of the public key value in a signature block. In some examples, the disclosed method includes storing the public key hash in a Trusted Platform Module (TPM), and further include storing the public key in a file and storing a hash of the file in a Trusted Platform Module (TPM) to protect the integrity of the public key.

Still other disclosed methods include storing a hash of a first public key in a policy data structure of a platform at a first time, extracting a second public key from a signature block associated with a data structure to be authenticated at a second time, when a hash of the second public key matches the hash of the first public key, extracting an encrypted hash from that signature block, decrypting the encrypted hash using the second public key to determine a decrypted value, and comparing the decrypted value with a hash of the data structure to verify the data structure integrity. Some example methods include the hash of the first public key is from a manufacturer of the platform code when the platform was manufactured. Other disclosed methods include storing the key hash in a location in a trusted platform module (TPM) that can only be written by the platform manufacturer to confirm that the hash of the first public key belongs to the platform manufacturer. Still other example methods include storing the key hash in a policy data structure in non-volatile memory or file storage and protecting the integrity of the policy data structure by saving a hash measurement of the policy data structure in a location in a trusted platform module (TPM) that can only be written by the platform owner to confirm that the hash of the first public key belongs to the platform manufacturer. Some disclosed example methods include the code measurement from the list associated with the signature block comprises an updated PCR0 hash measurement value associated with the platform code, and other example disclosed methods include the code measurement from the list associated with the signature block comprises an updated operating system trusted code measurement value associated with the platform code. Example disclosed methods include extracting a list of known-good code measurements from the data structure associated with the signature block when the decrypted value is the same as the hash of the data structure, further including authorizing the platform code in response to the match.

Example disclosed apparatus include a policy data structure verification engine to store a hash of a first public key in a policy data structure of a platform at a first time, a signature block authentication engine to extract a second public key from a signature block associated with a data structure to be authenticated at a second time, when a hash of the second public key matches the hash of the first public key, extract an encrypted hash from the signature block, decrypt the encrypted hash using the second public key to determine a decrypted value, and compare the decrypted value with a hash of the data structure to verify the data structure integrity. Other disclosed apparatus include the hash of the first public key is from a manufacturer of the platform code when the platform was manufactured. Some disclosed apparatus include a signed list manager to store the key hash in a location in a trusted platform module (TPM) that can only be written by the platform manufacturer to confirm that the hash of the first public key belongs to the platform manufacturer. Still other example disclosed apparatus include a signed list manager to store the key hash in a policy data structure in non-volatile memory or file storage and to protect the integrity of the policy data structure by saving a hash measurement of the policy data structure in a location in a Trusted Platform Module (TPM) that can only be written by the platform owner to confirm that the hash of the first public key belongs to the platform manufacturer. Other disclosed example apparatus include the code measurement from the list associated with the signature block comprises an updated PCR0 hash measurement value associated with the platform code, while other disclosed example apparatus include a signed list manager to extract a list of known-good code measurements from the data structure associated with the signature block when the decrypted value is the same as the hash of the data structure. Some disclosed example apparatus include a policy engine to authorize the platform code in response to the match.

Some disclosed example articles of manufacture storing machine readable instructions are included that, when executed, cause a machine to store a hash of a first public key in a policy data structure of a platform at a first time, extract a second public key from a signature block associated with a data structure to be authenticated at a second time, when a hash of the second public key matches the hash of the first public key, extract an encrypted hash from that signature block, decrypt the encrypted hash using the second public key to determine a decrypted value, and compare the decrypted value with a hash of the data structure to verify the data structure integrity. Other example disclosed articles of manufacture include instructions that, when executed, cause a machine to store the key hash in a location in a trusted platform module (TPM) that can only be written by the platform manufacturer to confirm that the hash of the first public key belongs to the platform manufacturer, while still other examples include storing the key hash in a policy data structure in non-volatile memory or file storage and protect the integrity of the policy data structure by saving a hash measurement of the policy data structure in a location in a trusted platform module (TPM) that can only be written by the platform owner to confirm that the hash of the first public key belongs to the platform manufacturer. Some example disclosed articles of manufacture include instructions that, when executed, cause a machine to update a PCR0 hash measurement value associated with the platform code. Other examples include extracting a list of known-good code measurements from the data structure associated with the signature block when the decrypted value is the same as the hash of the data structure, and still other examples include authorizing the platform code in response to the match.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to authorize use of platform code, comprising:
   storing a hash of a first public key associated with a manufacturer of the platform code in a policy data structure (PDS) of a platform at a first time, the PDS to identify at the first time a combination of platform control registers (PCRs) to be used with the platform;
   calculating a hash of the PDS at a second time and comparing the hash of the PDS to a hash of the PDS stored in a Trusted Platform Module (TPM), the second time occurring prior to updating the platform code;
   verifying the PDS is safe when (1) the comparison between the hash of the PDS matches the hash of the PDS in the TPM and (2) the combination of PCRs represented in the PDS at the first and the second time match;
   extracting a second public key from a signature block embedded in update code to be authenticated;
   verifying the signature block of the update code is authentic when a hash of the second public key matches the hash of the first public key;
   extracting an encrypted hash of the update code and an unencrypted list of PCR measurements from the signature block;
   decrypting the encrypted hash of the update code using the second public key from the verified signature block to determine a decrypted value; and
   authorizing updating of the platform code with the update code when the decrypted value corresponds to the unencrypted list of PCR measurements.

2. A method as defined in claim 1, further including storing the hash of the first public key in a location in the TPM that can only be written by the platform manufacturer to confirm that the hash of the first public key belongs to the platform manufacturer.

3. A method as defined in claim 1, further including storing the hash of the first public key in the PDS in non-volatile memory or file storage and protecting the integrity of the PDS by saving the hash of the PDS in a location in the TPM that can only be written by the platform owner to confirm that the hash of the first public key belongs to the platform manufacturer.

4. A method as defined in claim 1, wherein the update code associated with the signature block includes an updated PCR0 hash measurement value.

5. A method as defined in claim 1, wherein the update code associated with the signature block includes an updated operating system trusted code measurement value.

6. A method as defined in claim 1, further including extracting a list of known-good code measurements from the PDS associated with the signature block when the decrypted value is the same as the hash of the PDS.

7. An apparatus to authorize platform code, comprising:
   a policy data structure verification engine to store a hash of a first public key associated with a manufacturer of the platform code in a policy data structure (PDS) of a platform at a first time, the PDS to identify at the first time a combination of platform control registers (PCRs) to be used with the platform;
   a signature block authentication engine to:
      calculate a hash of the PDS at a second time, and compare the hash of the PDS to a hash of the PDS stored in a Trusted Platform Module (TPM), the second time occurring prior to updating the platform code;
      verify the PDS is safe when the comparison between the hash of the PDS matches the hash of the PDS stored in the TPM and the combination of PCRs is represented in the PDS at the first time and the second time;
      extract a second public key from a signature block embedded in update code to be authenticated;
      verify the signature block of the update code is authentic when a hash of the second public key matches the hash of the first public key;
      extract an encrypted hash of the update code and an unencrypted list of PCR measurements from the signature block;
      decrypt the encrypted hash using the second public key from the verified signature block to determine a decrypted value; and
      authorize updating of the platform code with the update code when the decrypted value corresponds to the unencrypted list of PCR measurements.

8. An apparatus as defined in claim 7, further including a signed list manager to store the hash of the first public key in a location in the TPM that can only be written by the platform manufacturer to confirm that the hash of the first public key belongs to the platform manufacturer.

9. An apparatus as defined in claim 7, further including a signed list manager to store the hash of the first public key in the PDS in non-volatile memory or file storage and to protect the integrity of the PDS by saving a hash measurement of the PDS in a location in the TPM that can only be written by the platform owner to confirm that the hash of the first public key belongs to the platform manufacturer.

10. An apparatus as defined in claim 7, wherein the update code associated with the signature block includes an updated PCR0 hash measurement value.

11. An apparatus as defined in claim 7, further including a signed list manager to extract a list of known-good code measurements from the PDS associated with the signature block when the decrypted value is identical to the hash of the PDS.

12. A tangible machine readable storage medium comprising instructions that, when executed, cause a platform to, at least:
   store a hash of a first public key associated with a manufacturer of platform code in a policy data structure (PDS) of the platform at a first time, the PDS to identify at the first time a combination of platform control registers (PCRs) to be used with the platform;

calculate a hash of the PDS at a second time and compare the hash of the PDS to a hash of the PDS stored in a Trusted Platform Module (TPM), the second time occurring prior to updating the platform;

verify the PDS is safe when (1) the comparison between the hash of the PDS matches the hash of the PDS stored in the TPM and (2) the combination of PCRs in the PDS at the first and the second time match;

extract a second public key from a signature block embedded in update code to be authenticated;

verify the signature block of the update code is authentic when a hash of the second public key matches the hash of the first public key, and extract an encrypted hash of the update code and an unencrypted list of PCR measurements from the signature block;

decrypt the encrypted hash using the second public key from the verified signature block to determine a decrypted value; and authorize updating of the platform code with the update code when the decrypted value corresponds to the unencrypted list of PCR measurements.

13. A machine readable storage medium as defined in claim 12, wherein the instructions, when executed, cause the platform to store the hash of the first public key in a location in the TPM that can only be written by the platform manufacturer to confirm that the hash of the first public key belongs to the platform manufacturer.

14. A machine readable storage medium as defined in claim 12, wherein the instructions, when executed, cause the platform to store the hash of the first public key in the PDS in non-volatile memory or file storage and protect the integrity of the PDS by saving the hash of the PDS in a location in the TPM that can only be written by the platform owner to confirm that the hash of the first public key belongs to the platform manufacturer.

15. A machine readable storage medium as defined in claim 12, wherein the instructions, when executed, cause the platform to update a PCR0 hash measurement value associated with the update code.

16. A machine readable storage medium as defined in claim 12, wherein the instructions, when executed, cause the platform to extract a list of known-good code measurements from the PDS associated with the signature block when the decrypted value is the same as the hash of the PDS.

* * * * *